United States Patent [19]

Kolbert

[11] Patent Number: 4,985,922
[45] Date of Patent: Jan. 15, 1991

[54] SIGNAL AND POWER TRANSMISSION THROUGH A WALL

[75] Inventor: Melvin Kolbert, Boca Raton, Fla.

[73] Assignee: Grumman Aerospace Corporation, Bethpage, N.Y.

[21] Appl. No.: 224,605

[22] Filed: Jul. 27, 1988

[51] Int. Cl.⁵ .............................................. H04B 5/00
[52] U.S. Cl. ........................................ 380/59; 381/79; 340/870.28; 340/870.31; 102/206; 439/38; 439/39
[58] Field of Search ............... 439/34, 38, 39; 381/79; 340/870.28, 870.31–870.37, 825, 73

[56] References Cited

U.S. PATENT DOCUMENTS

| 3,176,228 | 3/1965 | Phillips et al. | 455/64 |
| 3,195,540 | 7/1965 | Waller | 128/422 |
| 3,228,337 | 1/1966 | Grantham et al. | 102/207 |
| 3,306,206 | 2/1967 | Grantham | 102/206 |
| 3,310,736 | 3/1967 | Bayly et al. | 324/62 |
| 3,323,063 | 5/1967 | Walker et al. | 455/6 |
| 3,357,434 | 12/1967 | Abell | 128/419 P |
| 3,401,469 | 9/1968 | Shaver et al. | 434/307 |
| 3,488,632 | 1/1970 | Clark, III | 367/199 |
| 3,553,675 | 1/1971 | Shaver et al. | 340/310 A |
| 3,576,554 | 4/1971 | Temps, Jr. et al. | 340/870.28 X |
| 3,610,933 | 10/1971 | Shaver et al. | 455/610 |
| 3,668,321 | 6/1972 | Lang | 381/321 |
| 3,739,726 | 6/1973 | Pintell | 102/215 |
| 3,757,695 | 9/1973 | Fisher | 102/207 |
| 3,872,455 | 3/1975 | Fuller et al. | 340/870.28 X |
| 3,949,388 | 4/1976 | Fuller | 340/870.28 X |
| 4,025,912 | 5/1977 | Rice | 340/870.28 X |
| 4,038,601 | 7/1977 | Laborie et al. | 375/7 |
| 4,091,734 | 5/1978 | Redmond et al. | 102/207 |
| 4,160,416 | 7/1979 | Baracz | 102/215 |
| 4,166,470 | 9/1979 | Neumann | 128/419 PG |
| 4,318,342 | 3/1982 | Chandler | 102/207 |
| 4,322,998 | 4/1982 | Fowler et al. | 89/1.55 |
| 4,327,625 | 5/1982 | Beuchat et al. | 89/6 |
| 4,454,815 | 6/1984 | Beck | 102/206 |
| 4,495,851 | 1/1985 | Koerner et al. | 89/6.5 |
| 4,500,881 | 2/1985 | Beane | 340/825.73 |
| 4,508,936 | 4/1985 | Ingalls | 381/79 |
| 4,538,863 | 9/1985 | Allen et al. | 439/39 |
| 4,586,436 | 5/1986 | Denney et al. | 102/206 |
| 4,597,345 | 7/1986 | Reeser et al. | 114/20.1 |
| 4,632,031 | 12/1986 | Jarrott et al. | 102/206 X |
| 4,664,013 | 5/1987 | Wegner et al. | 102/215 X |
| 4,686,885 | 8/1987 | Bai | 102/206 X |
| 4,736,681 | 4/1988 | Hall et al. | 102/215 |
| 4,824,375 | 4/1989 | Weiner | 381/79 X |

FOREIGN PATENT DOCUMENTS 3106302 10/1982 Fed. Rep. of Germany ........ 381/79
112143 7/1982 Japan.

Primary Examiner—Stephen C. Buczinski
Assistant Examiner—Bernarr Earl Gregory
Attorney, Agent, or Firm—Pollock, VandeSande & Priddy

[57] ABSTRACT

An inductive coupling permits bi-directional data and power to be transferred through the skin of an aircraft thereby avoiding pin connectors. The coupling comprises a sending unit which is detachably mounted to the skin exterior, and the pick-up unit is located on the interior skin surface in alignment with the sending unit.

1 Claim, 2 Drawing Sheets

SIGNAL AND POWER TRANSMISSION THROUGH A WALL

FIELD OF THE INVENTION

The present invention relates to electrical couplers, and more particularly to a coupler for transmitting a digital signal and power through an aircraft skin or other thin wall.

BACKGROUND OF THE INVENTION

In the daily preparation of military aircraft, it is often necessary to store regularly updated security codes, known as crypto-variables or keys into weapon control and other communication systems such as friend or foe identification systems (IFF). This task is currently performed by a portable code storage box which is connected to an aircraft code memory device by means of conventional pin connectors. In the naval fleet this transfer of security codes to an aircraft is done during pre-dawn hours in all types of weather and sea conditions. On an aircraft carrier, this is manually performed by a crypto-custodian to aircraft that rests on the flight and hanger decks.

The procedure is difficult due to environment and is a time-consuming one requiring proper connector hook-up between aircraft and the custodian's portable security code box. Due to the harsh environment, connectors often deteriorate and the reliability of the connectors is limited. Typically, such connectors are called upon to transfer digital security codes to an internal code memory of the aircraft; and in order to avoid the necessity of turning on aircraft power, unnecessarily, a relatively low voltage is provided by batteries on the aircraft in order to power the security code storage devices within the aircraft. When the connectors between the portable code box and the aircraft evidence physical or electrical deterioration, errors in code transfer are possible as well as added unreliability due to batteries and associated electronics.

BRIEF DESCRIPTION OF THE INVENTION

The present invention is related to a coupling device which, preferably, magnetically transfers data and circuit power to an aircraft security code storage circuit without the inclusion of mechanical pin connectors. In the environment of an aircraft, the conventional custodian's security code portable transfer box is equipped with a sending and receiving (bi-directional) unit which is magnetically attached to the exterior of an aircraft skin. At an aligned position along the interior surface of the skin is a receiving/transmitting pick-up unit which magnetically picks up the digital code and low voltage power being transferred by the sending/receiving unit. The sending/receiving unit is easily removed after signal and power transfer have taken place by simply pulling it from the aircraft. As will be appreciated, such a simple and elegant technique avoids the problems of pin-type connectors which have been employed heretofore.

It should also be emphasized that, although the present invention is discussed in terms of an aircraft, a similar technique and attendant devices may be employed to complete electrical signal or power transfer through any relatively thin walled structure.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
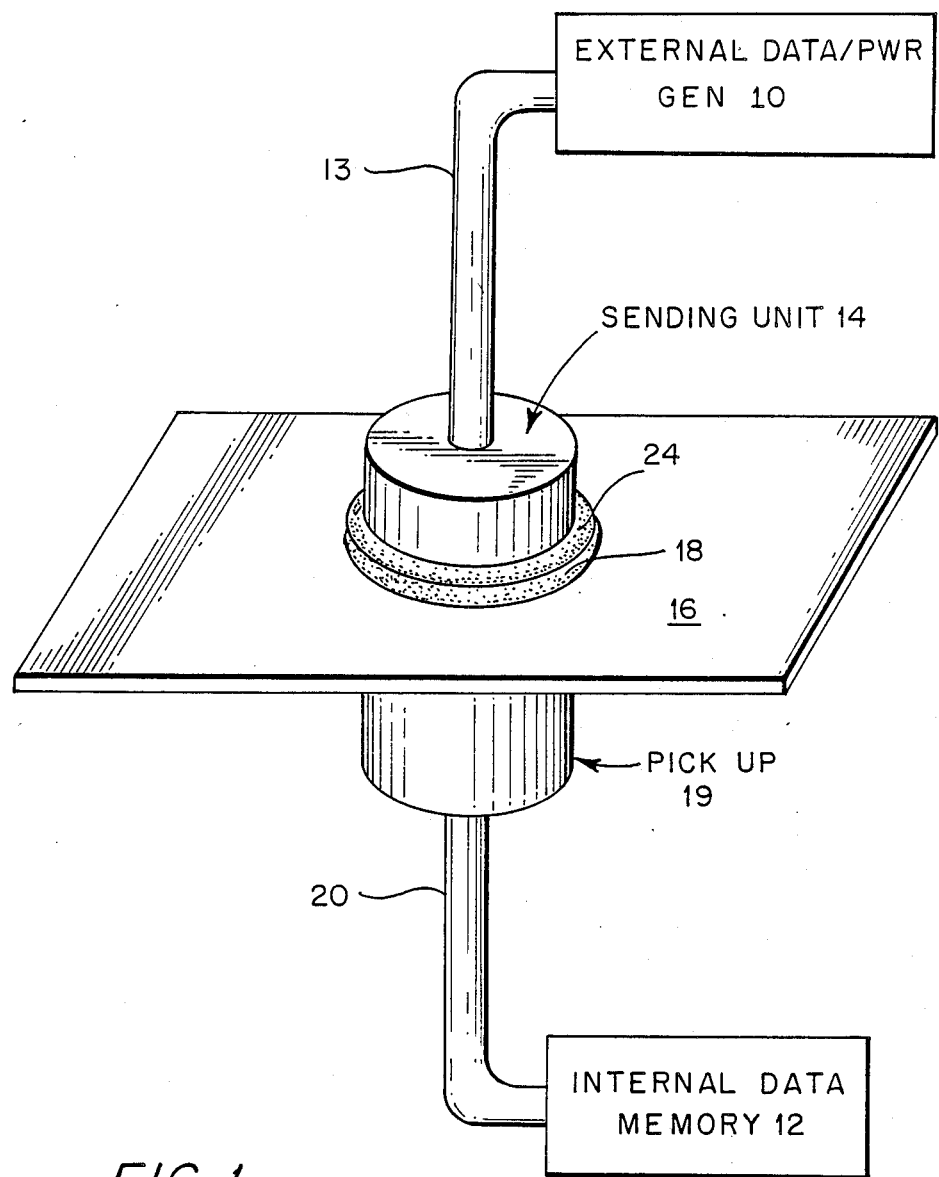
FIG. 1 is a diagrammatic illustration of the installation of the present invention on an aircraft skin.

FIG. 1 is a diagrammatic view of the present invention shown installed on an aircraft skin. The portable code box discussed in the Background of the Invention is indicated as an external data/power generator 10 in FIG. 1. Such an external storing generator has long been used in the prior art. In addition to being able to read out stored data, the generator 10 is supplied with a switch that initially powers an internal aircraft memory circuit when the aircraft's own power is off, thereby enabling a memory to start its data storage operation and send confirmation control signals back to the generator 10. (Bi-directional transmission).

Figure 2:
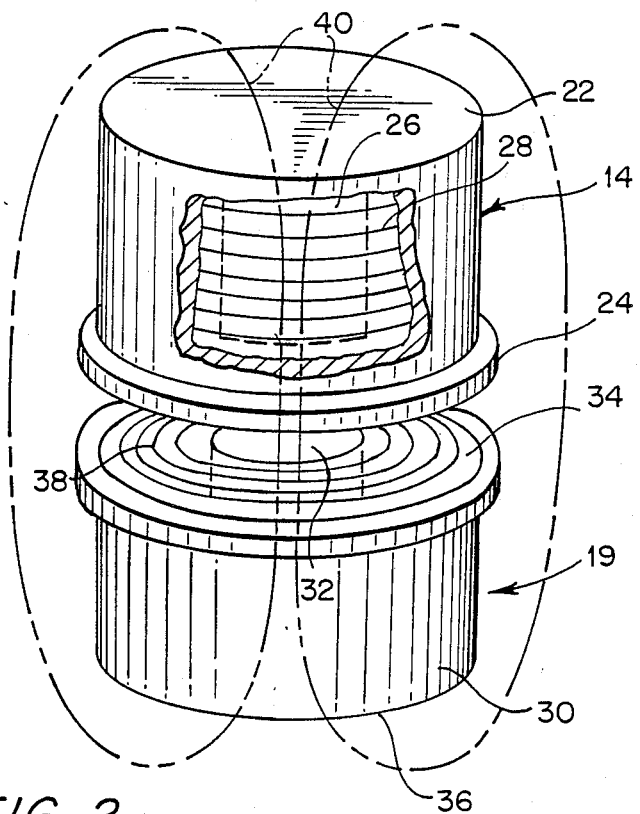
FIG. 2 is a cut-away diagrammatic view of a magnetic induction sending and pick-up bi-directional pair which forms the heart of the present invention.

The coupling of power and data from the generator 10 includes a cable 13 connected at a first end to generator 10 and at an opposite end to a sending unit 14. In a preferred embodiment of the present invention, such a unit is an inductive primary unit as shown in FIG. 2 to be discussed hereinafter.

The sending unit 14 is equipped with a circular magnetic ring 24, which may be of the gasket type used in home refrigerators. A mating magnetic ring 18 is appropriately cemented to the internal surface of an aircraft skin 16. The sending unit 14 is detachable from the aircraft skin by simply exerting sufficient tension. Of course, other types of temporary attachment may be employed such as suction, velcro, etc.

A complementary inductive pick-up unit 19 may be permanently cemented to the interior surface of the aircraft skin 16 or it may be temporarily mounted by utilizing ring magnets or the like, as just discussed in connection with the sending unit 14. Signals sent from generator 10 through the sending unit 14 are inductively picked-up by the pick-up unit 19 and transferred to an internal data memory 12 by means of a cable 20.

In operation of the device illustrated in FIG. 1, power may be supplied from the external data/power generator 10 to the internal data memory 12 in order to power the memory circuits if the aircraft power supply is turned off. The data memory circuits 12 are of the type that already exist aboard military aircraft. After the memory circuits have been sufficiently energized, the generator 10 may be switched to a data transmission mode so that the sending unit and pick-up units 14 and 19, respectively, may couple the data to the data memory 12.

The particular structure of the inductive coupling units 14 and 19 are illustrated in greater detail in FIG. 2. However, it is to be emphasized that other types of sending and pick-up units, other than the particular inductive units illustrated in FIG. 2, may be employed.

For example, other types of magnetic, capacitive, sonic or vibratory transducers are technically feasible.

The particular magnetic inductance units shown in FIG. 2 include a sending unit 14 having a ferromagnetic housing 22 with a ring magnet, preferably a rubber gasket type ring magnet 24 cemented around the bottom periphery thereof. The magnet is for detachable connection to an aircraft skin, as previously mentioned. A cylindrical ferromagnetic coil form is axially disposed within the housing 22 and serves as a core for windings 28 also located within the housing. The winding 28 serves as a primary/secondary winding and cooperates with a secondary/primary winding 38, located within the pick-up unit 19, as will be discussed hereinafter. To simplify the following explanation, winding 28 will be described as a primary while winding 38 will be described as a secondary. An electromagnetic field is created between the primary winding 28, core 26 and the housing 22.

The pick-up unit 19 includes a similar structure, namely, a central ferromagnetic core 32 with a secondary winding 38 secured thereto and a ferromagnetic housing 30 which may be opened on the illustrated top end 34 to allow the sending structure to be cemented, at this end, to the interior surface of an aircraft skin. Alternately, this end may be enclosed and detachably mounted to the interior surface of an aircraft skin by means of ring magnets, as discussed in connection with FIG. 1. The opposite end 36 of the pick-up unit 19 is closed. An electromagnetic field is created between the cores 26 and 32 via housings 22 and 30. When the sending and pick-up units are positioned on opposite sides of an aircraft skin, the two units are inductively coupled and magnetic flux lines link the two, as indicated by reference numeral 40.

Figure 3:
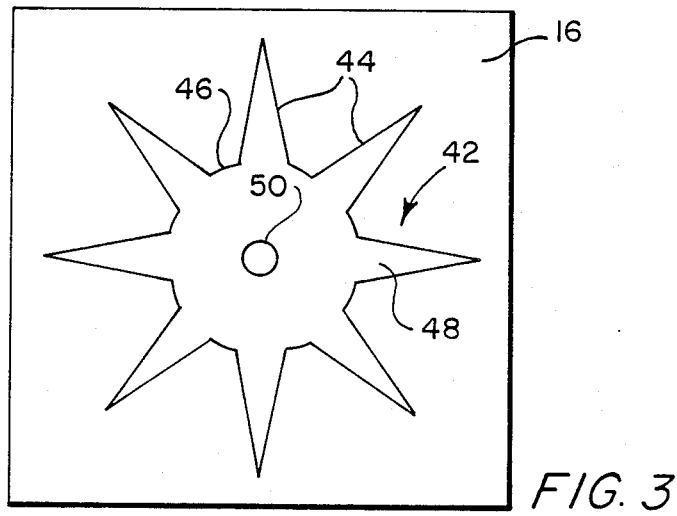
FIG. 3 is a diagrammatic elevational view of a section of an aircraft skin to which a sending and receiving bi-directional pair, such as shown in FIG. 2, is attached.

In order to minimize power dissipation of the coupled signal and power, it would be preferable to have the area of the aircraft skin between the sending and pick-up units fabricated from a non-conducting material. This is a preferable design consideration when high frequencies are employed or otherwise, unwanted eddy currents may develop. In order to maximize the structural connection of a non-conductive area to a conductive aircraft skin, a slotted configuration as shown in FIG. 3 may be employed. In this figure, an area of the aircraft skin 16 has a star-shaped slot 42 cut therein. The void created is filled with a non-conductive material so as to completely fill the slot as indicated by reference numeral 48. The slot itself is characterized by pointed projections 44 interconnected around a circular boundary 46. The utilization of the pointed projections increases the electrical and electromagnetic resistance of the aircraft skin in the vicinity of installation for sending and pick-up units which results in a decrease of power dissipation between the sending and pick-up units. In addition, the projections serve to mechanically interlock the non-conductive material 48 to the aircraft skin 16, this being an important consideration in the harsh environment encountered along the outer skin of a military high-speed aircraft.

The center of the filled-in slot may have a central spot 50 painted thereon so as to guide the center placement of the sending unit 14 when data and power are to be inductively coupled.

Although a simplified inductive coupling is illustrated in connection with the sending and pick-up units, it is also possible to use multiple coils to separate the coupled signal and power so that two distinctive coupling paths are created.

Other methods for separating power and data include the utilization of an analog filter in the aircraft which would separate data and power signals. Alternatively, if power is transmitted during a data cut-off period, an electronic switch would be required in the aircraft to separate power and data. The power could be refreshed at various time periods. A small capacitor would be required to store power between refresh cycles.

As will be appreciated from a review of the invention, simple and reliable devices are offered which make it possible to quickly and conveniently transfer data and power through a thin wall, such as an aircraft skin, while minimizing power dissipation.

It should be understood that the invention is not limited to the exact details of construction shown and described herein for obvious modifications will occur to persons skilled in the art.

I claim:

1. An inductive coupling for transferring a signal across a thin conductive wall, the coupling comprising: a sending unit having
   (a) a housing made of ferromagnetic material;
   (b) a central core about which is wrapped a coil which receives the signal from a source; and
   (c) a ring magnet secured to the sending unit housing and extending outwardly therefrom for permitting detachable mounting to the wall; and further wherein the coupling includes a pick-up unit having
      (a) a housing made of ferromagnetic material and located entirely within the wall interior and in contact therewith, in alignment with the sending unit;
      (b) a central core about which is wrapped a coil which receives the couple signal for distribution to a utilization device;
   the wall having an opening with projections therearound, the opening filled with non-conductive material,
   wherein the coupling exists across the filled opening for decreasing coupling power dissipation.

* * * * *

UNITED STATES PATENT AND TRADEMARK OFFICE
CERTIFICATE OF CORRECTION

PATENT NO. : 4,985,922
DATED : January 15, 1991
INVENTOR(S) : Melvin Kolbert

It is certified that error appears in the above-identified patent and that said Letters Patent is hereby corrected as shown below:

Column 4, line 48, change "couple" to --coupled--.

Signed and Sealed this

Ninth Day of June, 1992

Attest:

DOUGLAS B. COMER

*Attesting Officer*  *Acting Commissioner of Patents and Trademarks*